Patented Oct. 31, 1944

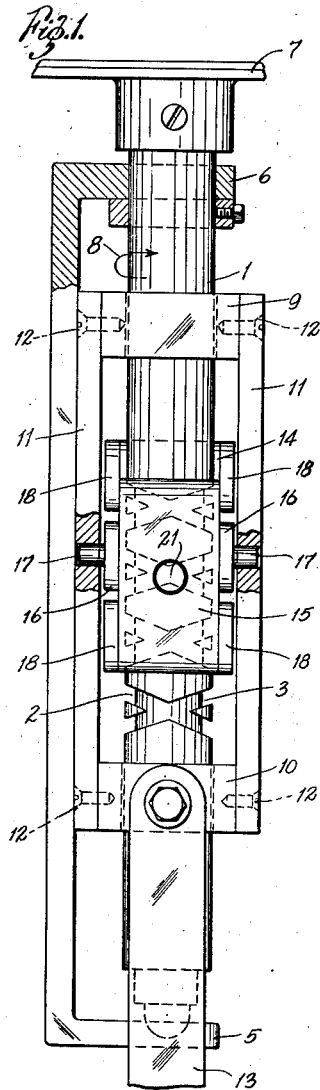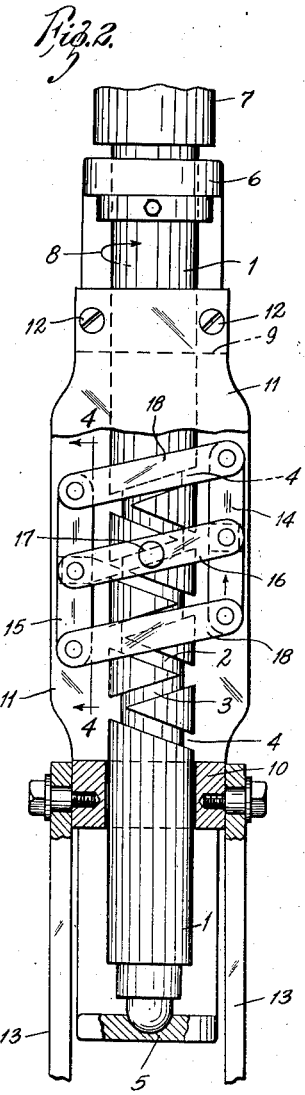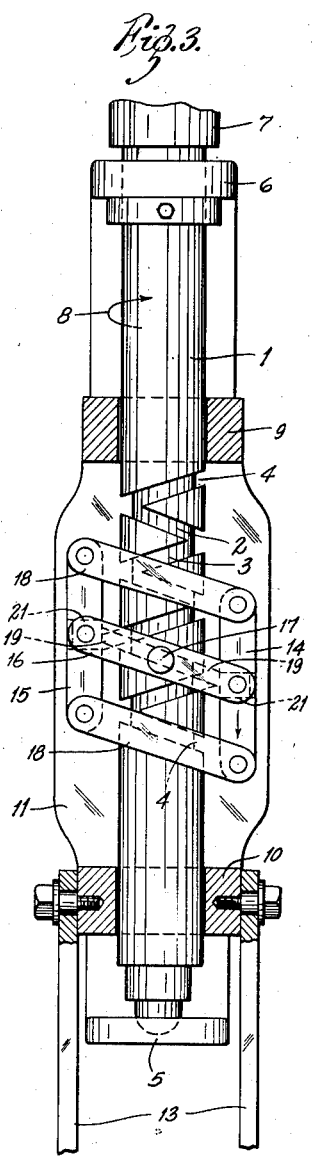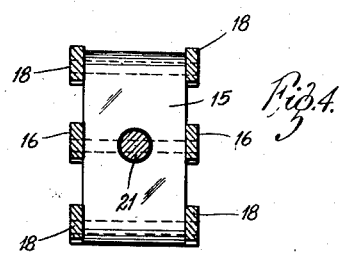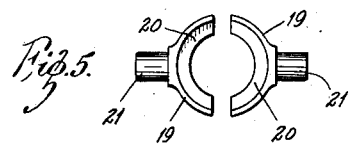

2,361,821

UNITED STATES PATENT OFFICE 2,361,821

MOTION CONVERTING MECHANISM

Morton B. Crowe, Tulsa, and Henry Hatter, Okmulgee, Okla., assignors of thirty per cent to Hughey Baker and twenty per cent to Eugene Fingerlin Application December 27, 1943, Serial No. 515,664

7 Claims. (Cl. 74—57)

This invention relates to a motion converting mechanism; and has special reference to mechanism for imparting reciprocating movements to an article, device or mechanism by a continuous rotary motion of a driven shaft.

The invention may be applied to various uses, as for operating reciprocating sucker rods in well pumps, air compressors, jig saws, hack saws, planes, and various other analogous purposes. These suggested uses of the invention do not constitute a limitation. On the contrary, the specific disclosure of the invention and its novel mode of operation should suggest other uses to which the invention may well be usefully applied.

Objects of the invention are to provide an improved mechanism for generating or imparting reciprocating movements to different articles, devices or mechanisms and comprising a power-driven rotary shaft having two oppositely inclined spiral grooves that cross or intersect each other along diametrically opposite portions of said shaft and which are continuous and endless in the particular that each opens into the other at one selected point and then continues in the reverse direction through said other groove to another and opposite point of intercommunication of said grooves; to provide a connecting device whereby said shaft may be rotated continuously in one direction while held from longitudinal or axial displacement in supporting bearings for said shaft; to provide a reciprocating frame between said bearings having connections for imparting reciprocating movements to the article, device or mechanism to be reciprocated (such, for instance, as those suggested or others); to provide respective leader and follower members in said frame and having pivotal connection with each other and with said frame whereby one of said members leads and the other follows during operation of the device; and to provide nut or shoe elements connected with said members, respectively, and engaging in said grooves alternately during continuous rotation of said shaft thereby reversing the directions of movement of said frame, with the result that said frame is reciprocated by continuous rotation of said shaft in one direction.

Another object of the invention is to provide novel mechanism for generating or imparting reciprocating movements by continuous rotation of a shaft in one direction, comprising a frame mounted for reciprocation by said shaft and having a pair of relatively movable members, in combination with a pair of elements attached to said members and engaging successively in diametrically opposite portions of endless intersecting grooves formed in said shaft whereby a balanced non-percussive reciprocating movement is imparted to said frame by the continuous rotation of said shaft in one direction, and thereby to the ultimate article, device, or mechanism to be reciprocated.

Various other objects and advantages of the invention should be apparent from the following description, reference being made to the annexed drawing, in which—

Fig. 1 is a side elevation showing a preferred embodiment of our present invention, parts being broken away and shown in section.

Fig. 2 is another side elevation at 90° from that shown in Fig. 1 with parts broken away and shown in section.

Fig. 3 is a view similar to Fig. 2, showing the follower and leader members in their relative positions when moving in the opposite direction from that in which they are moving in the arrangement shown in Fig. 2.

Fig. 4 is a sectional view on the line 4—4 of Fig. 2.

Fig. 5 is a view showing the two nut or shoe elements detached from the leader and follower members to which they are pivoted.

The power-driven rotary drive shaft 1 has two spiral grooves 2 and 3 of uniform depth and width, extending around the shaft in reverse directions so that said grooves intersect and cross each other. These grooves are of equal and uniform width and depth, and extend along the shaft a distance equal to the distance in which the ultimate article, device or mechanism is to be moved or reciprocated in each direction. The grooves communicate with each other through connections 4 which constitute intercommunicating passages through which the respective shoe elements pass from one groove to the other. The shaft 1 is journalled for rotation in and held from endwise movement in bearings 5 and 6. Said shaft is equipped with a clutch member 7 or other device whereby it may be rotated constantly in one direction by power mechanism (not shown). The direction of rotation of said shaft is indicated by the arrow 8.

A reciprocating frame is mounted adjacent to the shaft 1 between the bearings 5 and 6. As shown, said frame comprises two spaced end members 9 and 10 having holes through which the shaft 1 extends, and side frame members 11 rigidly and detachably connected to said end members 9 and 10 by removable and replaceable fasteners 12, or otherwise. Said frame may be connected with the ultimate article, device or mechanism to be reciprocated by a link or yoke device 13 or other appropriate connection.

Leader member 14 and a follower member 15 are mounted in the reciprocating frame for movements relative to each other and relative to said frame, and are operatively connected with the shaft 1 within the grooves 2 and 3 for operation thereby to impart reciprocating movements to said frame. The leader member 14 and the follower member 15 are mounted at diametrically opposite sides of the shaft 1 and preferably out of contact with said shaft so that said members may be moved relative to each other, to said shaft, and to said reciprocating frame, without substantial frictional or other resistance. Said leader member 14 and follower member 15 are pivotally connected together by a pair of links 16 extending across diametrically opposite sides of the shaft 1 and out of contact therewith; and are pivotally connected with said frame by studs 17 projecting from said links and pivotally engaging in holes in the frame side members 11. Thus, said frame will be reciprocated by longitudinal reciprocating movements of the leader and follower members 14 and 15. Other links 18 pivotally connect end portions of the leader member 14 with corresponding end portions of the follower member 15, but do not have pivotal or other connection with the reciprocating frame. Said links 18 prevent relative disarrangement of the members 14 and 15.

The leader member 14 and the follower member 15 each supports a nut or shoe element for engaging in the grooves 2 and 3 successively and alternately during rotation of the shaft 1. These two nut or shoe elements are shown apart from the leader and follower members in Fig. 5. Each consists of an arcuate nearly semi-circular portion 19 having an internal rib or flange 20 for engaging in the grooves 2 and 3 alternately and successively during rotation of the shaft 1. Each arcuate nut or shoe element also includes a radially projecting lug 21 pivoted to the adjacent leader member 14 or follower member 15, as the case may be. That is, one of said two nut or shoe elements is pivoted to the leader member 14, and the other of said two nut or shoe elements is pivoted to the follower member 15. These two nut or shoe elements partially encircle adjacent portions of the shaft 1 and, because of their engagement in the grooves 2 and 3, they are moved longitudinally along said shaft when said shaft is rotated. This movement continues in one direction until the nut or shoe element that is connected with the leader member 14 reaches and passes into and through the intercommunication 4 and thereby passes from the groove 2 into the groove 3, or vice versa. Then the leader member 14 begins to move in the opposite direction while the follower member 15 continues to move in the first direction until its nut or shoe element reaches and passes into and through the intercommunication 4, whereupon said follower begins to move in said opposite direction. Thus, it will be seen that the member 14 is always in advance of the member 15, so that said member 14 is properly termed the leader member and the member 15 is properly termed the follower member.

In our invention, the actuators for the reciprocating frame are disposed at diametrically opposite sides of the shaft 1. The fact that the direction of movement of the leader member 14 is reversed and movement thereof in the opposite direction is initiated before the follower member 15 enters the intercommunicating connection 4, positively prevents any percussive action or effect of or upon the reciprocating frame at the ends of its movements in opposite directions. This enables the ultimate article, device or mechanism to be reciprocated uniformly and symmetrically without percussive action or effect, and without sharp suddenly arrested pulls or jerks. This is highly desirable in most instances because it avoids the damaging and injurious effects of percussions, sharp suddenly arrested pulls and jerks, extends and prolongs the durability and life of the mechanism, and for other known reasons.

From the foregoing, it should be apparent that our invention attains all of its intended objects and purposes most efficiently and satisfactorily. We do not restrict ourselves in unessential particulars, but contemplate equivalent variations in the construction and operation of the device without departure from the nature and principle of the invention as defined by the appended claims.

We claim:

1. Mechanism of the character described comprising a drive shaft supported for constant rotation in one direction and having two grooves extending spirally in reverse directions and intersecting and crossing each other, a frame adjacent to said shaft, two members connected with said frame for longitudinal movement relative to each other and to said shaft, and shoe elements attached to said members respectively and engaging in said grooves alternately and successively during constant rotation of said shaft in said one direction, thereby imparting said relative longitudinal movements to said members and also imparting reciprocating movements to said frame and preventing percussion of said frame at the ends of said reciprocating movements thereof.

2. Mechanism of the character described comprising a pair of spaced bearings, a shaft journalled in said bearings for constant rotation in one direction and having two grooves extending spirally in reverse directions and intersecting and crossing each other, a frame supported for longitudinal movements along said shaft between said bearings, two members mounted in said frame at opposite sides of said shaft, means pivotally connecting said members with each other and with said frame for longitudinal movements relative to each other and to said frame and to said shaft, shoe elements attached to said members respectively and engaging in said grooves alternately and successively during constant rotation of said shaft in said one direction, thereby imparting said relative longitudinal movements to said members and also imparting reciprocating movements to said frame and preventing percussion of said frame at the ends of said movements thereof in opposite directions, and means connected with said frame for imparting a reciprocating movement to the ultimate article, device or mechanism to be reciprocated.

3. Mechanism of the character described comprising a shaft supported for constant rotation in one direction and having two grooves extending spirally in reverse directions and intersecting and crossing each other, a frame supported for longitudinal movements along said shaft, two members mounted in said frame at opposite sides of said shaft, elements pivotally connecting said two members with each other and with said frame and leaving said members free for longitudinal movements relative to each other and to said frame and to said shaft, and shoe elements pivotally connected with said members respectively and engaging in said grooves alternately and successively during constant rotation of said shaft in said one direction, thereby imparting said relative longitudinal movements to said members and also imparting reciprocating movements to and preventing percussion of said frame at the ends of said movements thereof in opposite directions.

4. Mechanism of the character described comprising a shaft supported for constant rotation in one direction and having two grooves extending spirally in reverse directions and intersecting and crossing each other, a frame mounted on said shaft for longitudinal reciprocating movements, two members located in said frame at diametrically opposite sides of said shaft, links pivotally connecting said two members with each other and with said shaft and leaving said two members free for longitudinal movements relative to each other and to said frame and to said shaft, other connections between said members preventing relative displacement thereof, and shoe elements pivoted to said members respectively and engaging in said grooves alternately and successively during constant rotation of said shaft and in said one direction, thereby imparting said relative longitudinal movements to said members and also imparting reciprocating movements to and preventing percussion of said frame at the ends of said movements thereof.

5. Mechanism of the character described comprising two axially alined bearings separated by an intervening space, a shaft journalled in said bearings for constant rotation in one direction and having two peripheral grooves between said bearings extending spirally in opposite directions and intersecting and crossing each other, a frame located for reciprocating movements along said shaft between said bearings, two shoe elements engaging in said grooves approximately at diametrically opposite sides of said shaft, and members having pivotal connection with said frame and pivotally supporting said shoe elements for moving said frame alternately in opposite directions when said shaft is continuously rotated in one direction.

6. Mechanism of the character described comprising two axially alined bearings separated by an intervening space, a shaft journalled for rotation in and having two peripheral grooves between said bearings extending spirally in opposite directions and intersecting and crossing each other and also having connecting passages between said grooves, two members pivotally connected with said frame for longitudinal movements relative to said frame and also relative to each other and to said shaft, and shoe elements pivotally attached to said members respectively and engaging in said grooves alternately and successively during constant rotation of said shaft in one direction, thereby imparting said relative longitudinal movements to said members and also moving said frame alternately in opposite directions and holding said frame stationary during the time that said shoe elements pass successively from one of said grooves to the other.

7. Mechanism of the character described comprising a shaft supported for rotation in one direction and having two peripheral grooves of equal length extending spirally in opposite directions and intersecting and crossing each other, a frame mounted for reciprocating movements along said shaft, two members located respectively at opposite sides of said shaft and having pivotal connection with each other and with said frame, shoe elements pivotally connected with said members respectively and engaging in said grooves alternately and successively during constant rotation of said shaft in said one direction, thereby moving said frame alternately in opposite directions, stopping movement of said frame during the times that said shoe elements pass from one groove to the other and vice versa, and preventing percussion of said frame at the ends of said movements thereof.

MORTON B. CROWE.
HENRY HATTER.